United States Patent
Zhang

(10) Patent No.: US 10,303,367 B2
(45) Date of Patent: May 28, 2019

(54) MAPPING TABLE UPDATING METHOD WITHOUT UPDATING THE FIRST MAPPING INFORMATION, MEMORY CONTROL CIRCUIT UNIT AND MEMORY STORAGE DEVICE

(71) Applicant: PHISON ELECTRONICS CORP., Miaoli (TW)

(72) Inventor: Wen-Jia Zhang, Hsinchu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 27 days.

(21) Appl. No.: 15/239,771

(22) Filed: Aug. 17, 2016

(65) Prior Publication Data
US 2018/0004413 A1   Jan. 4, 2018

(30) Foreign Application Priority Data
Jul. 1, 2016   (TW) .............................. 105120884 A

(51) Int. Cl.
G06F 12/00 (2006.01)
G06F 3/06 (2006.01)

(52) U.S. Cl.
CPC .............. G06F 3/061 (2013.01); G06F 3/064 (2013.01); G06F 3/0611 (2013.01); G06F 3/0655 (2013.01); G06F 3/0679 (2013.01); G06F 3/0688 (2013.01)

(58) Field of Classification Search
CPC ...... G06F 3/061; G06F 3/0655; G06F 3/0679; G06F 12/0246; G06F 2212/7201; G06F 3/0688
USPC ............ 711/202, 203, 206, 209, 102, 103, 5
See application file for complete search history.

(56) References Cited

U.S. PATENT DOCUMENTS

| | | | |
|---|---|---|---|
| 2012/0059972 A1* | 3/2012 | Chen | G06F 12/0246 711/4 |
| 2015/0186259 A1* | 7/2015 | Thomas | G06F 12/0246 711/103 |

* cited by examiner

*Primary Examiner* — Hong C Kim
(74) *Attorney, Agent, or Firm* — JCIPRNET

(57) ABSTRACT

A mapping table updating method, a memory control circuit unit and a memory storage device are provided. The mapping table updating method includes: recording first mapping information as a mapping relation between a first virtual block and a first physical erasing unit; recording second mapping information as a mapping relation between the first virtual block and a second virtual block, and the second virtual block is mapped to the first physical erasing unit; and updating the second mapping information as a mapping relation between the first virtual block and a third virtual block if copying data belonging to the first physical erasing unit to a second physical erasing unit, and the third virtual block is mapped to the second physical erasing unit.

21 Claims, 11 Drawing Sheets

| Virtual block of first layer | Virtual block of second layer |
|---|---|
| 801(0) | 802(5) |
| 801(1) | 802(1) |
| ⋮ | ⋮ |
| 801(A) | 802(15) |

| Logical unit | Physical programming unit |
|---|---|
| 612(18) | 700(1) |
| 612(20) | 700(2) |
| 612(3) | 700(3) |
| 612(1) | 700(4) |
| 612(7) | 700(5) |
| 612(0) | 701(1) |
| 612(2) | 701(2) |
| 612(9) | 701(3) |
| 612(10) | 701(4) |
| 612(5) | 701(5) |
| ⋮ | ⋮ |
| 612(25) | 708(1) |
| 612(11) | 708(2) |
| 612(8) | 708(3) |
| 612(4) | 708(4) |
| 612(13) | 708(5) |

720 ⟶ (rows 612(0)…612(5))
810 ⟶ (dotted rows)

| Virtual block of first layer | Virtual block of second layer |
|---|---|
| 801(0) | 802(5) |
| 801(1) | 802(2) |
| ⋮ | ⋮ |
| 801(A) | 802(15) |

MAPPING TABLE UPDATING METHOD WITHOUT UPDATING THE FIRST MAPPING INFORMATION, MEMORY CONTROL CIRCUIT UNIT AND MEMORY STORAGE DEVICE

CROSS-REFERENCE TO RELATED APPLICATION

This application claims the priority benefit of Taiwan application Ser. No. 105120884, filed on Jul. 1, 2016. The entirety of the above-mentioned patent application is hereby incorporated by reference herein and made a part of this specification.

BACKGROUND

Technical Field

The present invention relates to a mapping table updating method for a rewritable non-volatile memory, and a memory control circuit unit and a memory storage device using the method.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., a flash memory) ideal to be built in the portable multi-media devices as cited above.

In general, a memory storage device using the rewritable non-volatile memory module as a storage medium establishes a logical-physical mapping table for recording mapping information between logical addresses and physical erasing units (or between logical addresses and physical programming units) so a host system may successfully access data in the rewritable non-volatile memory module. However, when the memory storage device performs an operation of moving data from one original physical erasing unit to another new physical erasing unit, the memory storage device needs to update logical units corresponding to the physical programming units in the original physical erasing unit one by one as to be corresponding to the physical programming units in the new physical erasing unit in the logical-physical mapping table. That is, the memory storage device needs to change thousands of entry values in the logical-physical mapping table. Accordingly, a time spent for copying the data is increased such that a longer response time must be waited when other write or read commands are executed by the host.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a mapping table updating method, a memory control circuit unit and a memory storage device, which are capable of effectively reducing an operating time required for copying and moving data using the physical erasing unit as a unit, so as to improve speed and performance of the memory storage device when transmitting and accessing data.

In an exemplary embodiment, a mapping table updating method for a rewritable non-volatile memory module is provided. The rewritable non-volatile memory module has a plurality of physical erasing units. Each of the physical erasing units has a plurality of physical programming units. The mapping table updating method includes: recording first mapping information as a mapping relation between a first virtual block and a first physical erasing unit; recording second mapping information as a mapping relation between the first virtual block and a second virtual block, wherein the second virtual block is mapped to the first physical erasing unit; and updating the second mapping information as a mapping relation between the first virtual block and a third virtual block if copying data belonging to the first physical erasing unit to a second physical erasing unit, wherein the third virtual block is mapped to the second physical erasing unit.

In another exemplary embodiment, a memory control circuit unit for controlling a rewritable non-volatile memory module is provided. The rewritable non-volatile memory module includes a plurality of physical erasing units, and each of the physical erasing units includes a plurality of physical programming units. The memory control circuit unit includes a host interface, a memory interface and a memory management circuit. The host interface is configured to couple to a host system. The memory interface is configured to couple to a rewritable non-volatile memory module. The memory management circuit is coupled to the host interface and the memory interface. The memory management circuit is configured to record first mapping information as a mapping relation between a first virtual block and a first physical erasing unit, and record second mapping information as a mapping relation between the first virtual block and a second virtual block, wherein the second virtual block is mapped to the first physical erasing unit. The memory management circuit is further configured to update the second mapping information as a mapping relation between the first virtual block and a third virtual block if copying data belonging to the first physical erasing unit to a second physical erasing unit, wherein the third virtual block is mapped to the second physical erasing unit.

In another exemplary embodiment, a memory storage device including a connection interface unit, a rewritable non-volatile memory module and a memory control circuit unit is provided. The rewritable non-volatile memory module includes a plurality of memory cells, and the memory control circuit unit includes a host interface, a memory interface, an error checking and correcting circuit and a memory management circuit. The host interface is configured to couple to a host system. The memory interface is configured to couple to a rewritable non-volatile memory module. The memory management circuit is coupled to the host interface, the memory interface and the error checking and correcting circuit. The memory control circuit unit is configured to record first mapping information as a mapping relation between a first virtual block and a first physical erasing unit, and record second mapping information as a mapping relation between the first virtual block and a second virtual block, wherein the second virtual block is mapped to the first physical erasing unit. The memory control circuit unit is further configured to update the second mapping information as a mapping relation between the first virtual block and a third virtual block if copying data belonging to the first physical erasing unit to a second physical erasing unit, wherein the third virtual block is mapped to the second physical erasing unit.

Based on the above, in the exemplary embodiments of the present invention, two virtual blocks are assigned for each of the physical erasing units stored with data to record the mapping relation between the physical programming units of each physical erasing unit and the corresponding logical units as well as the mapping relation between the two virtual blocks. Accordingly, when the memory storage device performs the operation of copying or moving data using the physical erasing unit as a unit, it is only required to change the mapping relation between the virtual blocks. As a result, expiration on a response time of other write or read commands executed by the host may be prevented, so as to improve speed and performance of the memory storage device in terms of overall operation.

To make the above features and advantages of the present invention more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 8B is a schematic diagram illustrating a logical-physical re-mapping table according to an exemplary embodiment of the invention.

FIG. 10B is a schematic diagram illustrating the logical-physical mapping table and the logical-physical re-mapping table after copying data from one physical erasing unit to another physical erasing unit according to an exemplary embodiment of the invention.

DESCRIPTION OF THE EMBODIMENTS

Figure 1:
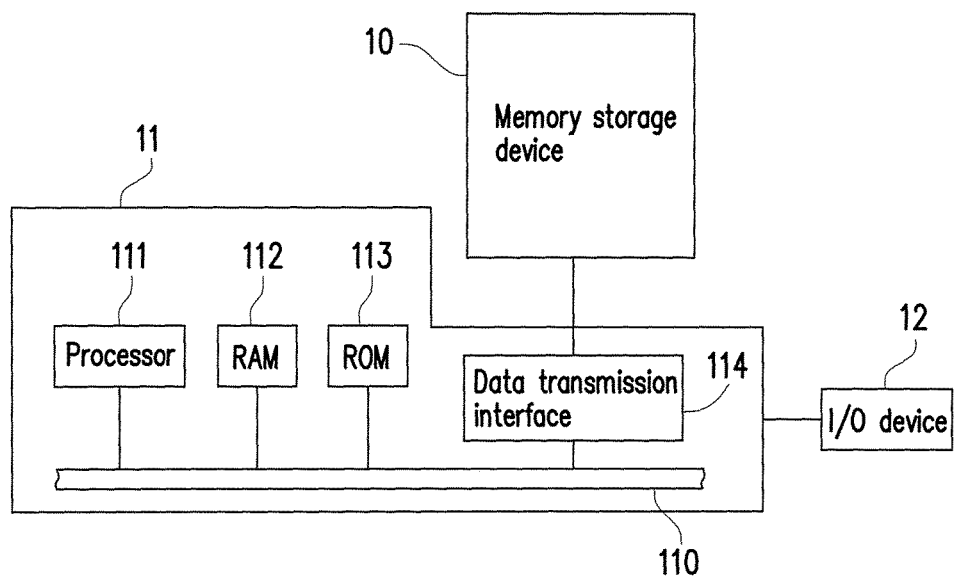
FIG. 1 is a schematic diagram illustrating a host system, a memory storage device and an I/O (input/output) device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also known as a memory storage system) includes a rewritable non-volatile memory module and a controller (also known as a control circuit). The memory storage device is usually configured to cooperate with a host system so the host system may write data into or read data from the memory storage device.

Figure 2:
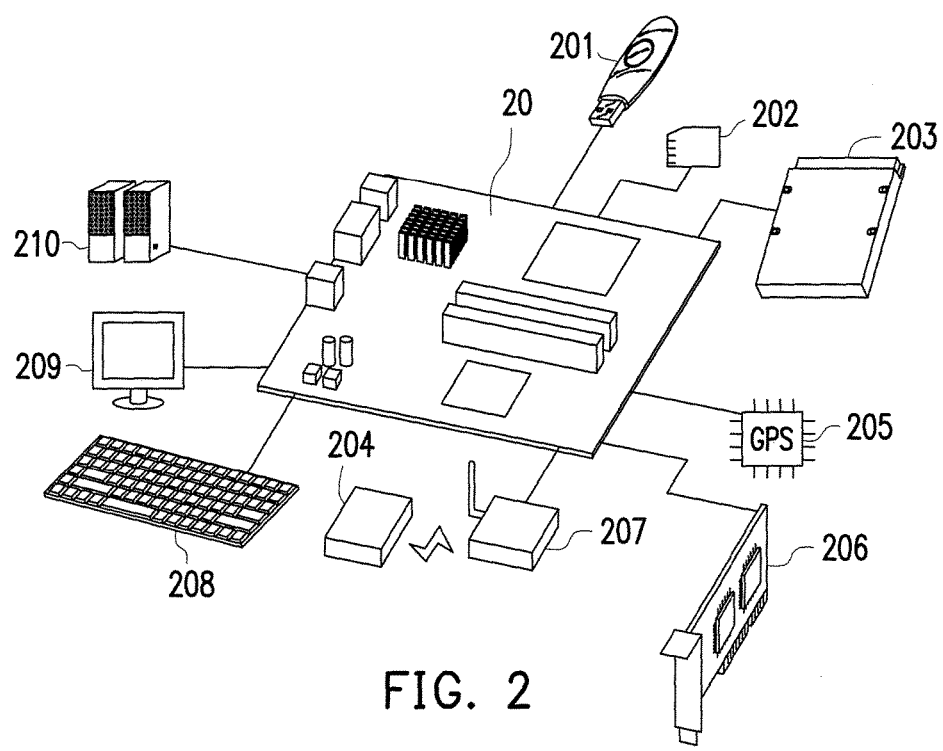
FIG. 2 is a schematic diagram illustrating a host system, a memory storage device and an I/O device according to another exemplary embodiment of the invention.

FIG. 1 is a schematic diagram illustrating a host system, a memory storage device and an I/O (input/output) device according to an exemplary embodiment of the invention. FIG. 2 is a schematic diagram illustrating a host system, a memory storage device and an I/O device according to another exemplary embodiment of the invention.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In the present exemplary embodiment, the host system 11 is coupled to a memory storage device 10 through the data transmission interface 114. For example, the host system 11 can write data into the memory storage device 10 or read data from the memory storage device 10 through the data transmission interface 114. Further, the host system 11 is coupled to an I/O device 12 through the system bus 110. For example, the host system 11 can transmit output signals to the I/O device 12 or receive input signals from the I/O device 12 through the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 through the wireless transmission device 207.

Figure 3:
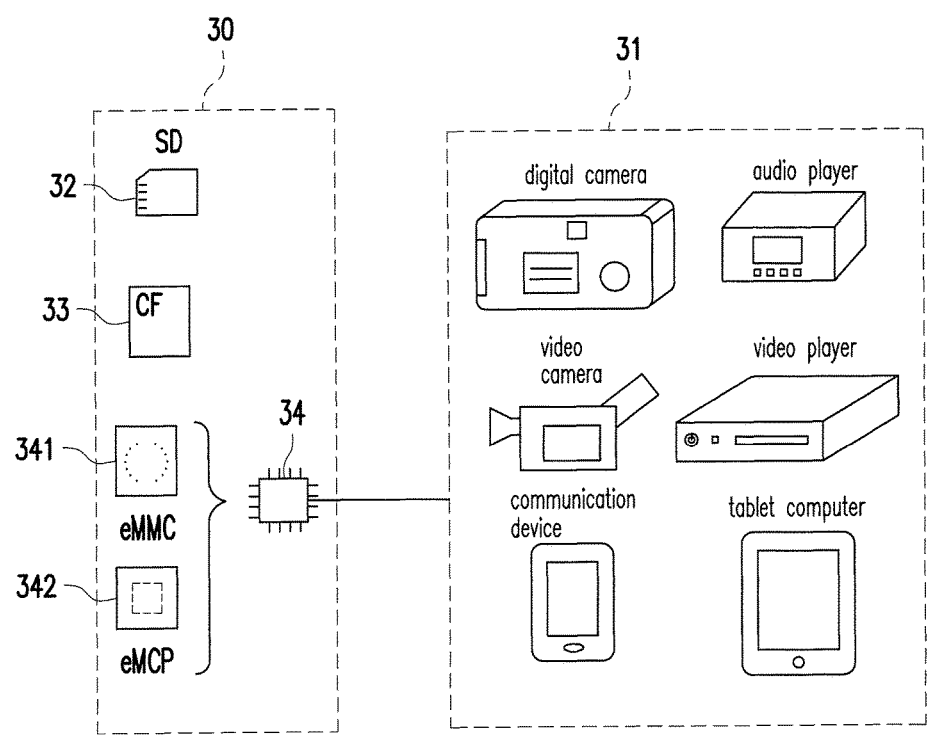
FIG. 3 is a schematic diagram illustrating a host system and a memory storage device according to another exemplary embodiment of the invention.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment of the invention. Referring to FIG. 3, in another exemplary embodiment, a host system 31 may also be a system including a digital camera, a video camera, a communication device, an audio player, a video player or a tablet computer, whereas a memory storage device 30 can be various non-volatile memory devices used by the host system, such as a SD card 32, a CF card 33 or an embedded storage device 34. The embedded storage device 34 includes various embedded storage devices capable of directly coupling a memory module onto a substrate of the host system, such as an eMMC (embedded MMC) 341 and/or an eMCP (embedded Multi Chip Package) 342.

Figure 4:
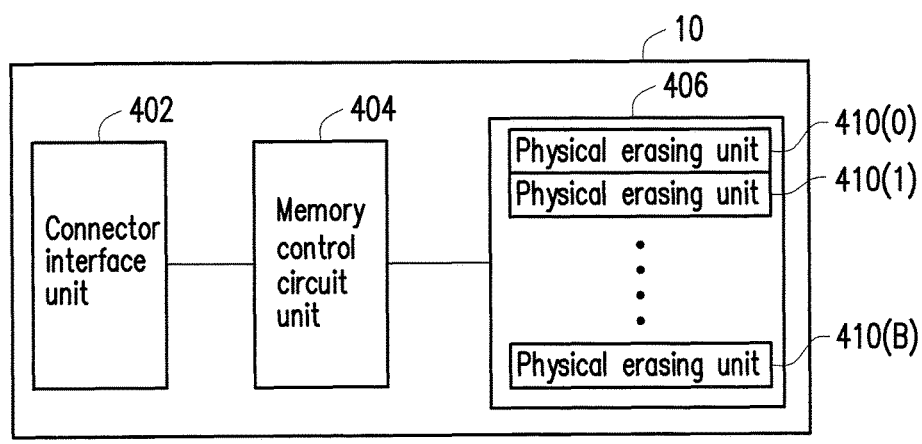
FIG. 4 is a schematic block diagram illustrating a memory storage device according to an exemplary embodiment of the invention.

FIG. 4 is a schematic block diagram illustrating a memory storage device according to an exemplary embodiment of the invention.

Referring to FIG. 4, the memory storage device 10 includes a connection interface unit 402, a memory control circuit unit 404 and a rewritable non-volatile memory module 406.

In the present exemplary embodiment, the connection interface unit 402 is compatible with a SATA (Serial Advanced Technology Attachment) standard. Nevertheless, it should be understood that the invention is not limited thereto. The connection interface unit 402 may also be compatible to a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD (Secure Digital) interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC (Embedded Multimedia Card) interface standard, a UFS (Universal Flash Storage) interface standard, an eMCP (embedded Multi Chip Package) interface standard, a CF (Compact Flash) interface standard, an IDE (Integrated Device Electronics) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control instructions which are implemented in a hardware form or in a firmware form and perform operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features.

The rewritable non-volatile memory module 406 is coupled to the memory control circuit unit 404 and configured to store data written from the host system 11. The rewritable non-volatile memory storage module 406 includes multiple physical erasing units 410(0) to 410(B). For example, the physical erasing units 410(0) to 410(B) may belong to the same memory die or belong to different memory dies. Each physical erasing unit has a plurality of physical programming units, and the physical programming units of the same physical erasing unit may be written separately and erased simultaneously. Nevertheless, it should be understood that the invention is not limited thereto. Each physical erasing unit may be constituted by 64 physical programming units, 256 physical programming units or any amount of the physical programming units.

Figure 5:
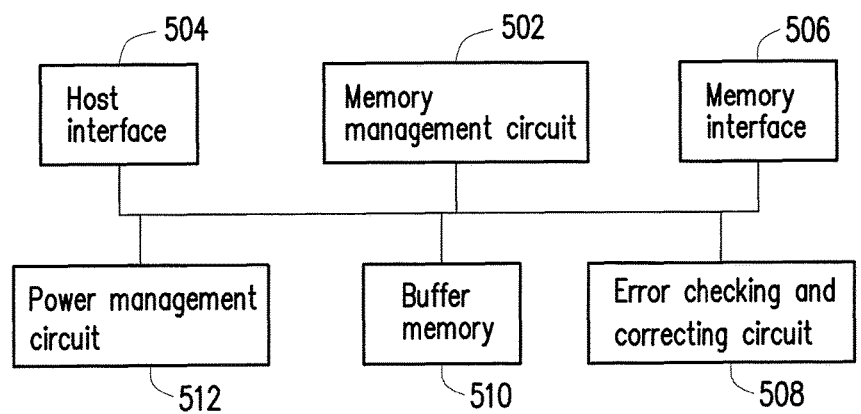
FIG. 5 is a schematic block diagram illustrating a memory control circuit unit according to an exemplary embodiment of the invention.

FIG. 5 is a schematic block diagram illustrating a memory control circuit unit according to an exemplary embodiment of the invention.

Referring to FIG. 5, the memory control circuit unit 404 includes a memory management circuit 502, a host interface 504 and a memory interface 506.

The memory management circuit 502 is configured to control overall operation of the memory control circuit unit 404. Specifically, the memory management circuit 502 has a plurality of control instructions and the control instructions are executed to perform various operations such as writing, reading and erasing data during operation of the memory storage device 10. Hereinafter, operations of the memory management circuit 502 are described as equivalent to describing operations of the memory control circuit unit 404.

In the present exemplary embodiment, the control instructions of the memory management circuit 502 are implemented in form of firmware. For instance, the memory management circuit 502 has a microprocessor unit (not illustrated) and a ROM (not illustrated), and the control instructions are burned into the ROM. When the memory storage device 10 operates, the control instructions are executed by the microprocessor to perform operations of writing, reading or erasing data.

In another exemplary embodiment, the control instructions of the memory management circuit 502 may also be stored as program codes in a specific area (for example, the system area in a memory exclusively used for storing system data) of the rewritable non-volatile memory module 406. In addition, the memory management circuit 502 has a microprocessor unit (not illustrated), the read only memory (not illustrated) and a random access memory (not illustrated). More particularly, the ROM has a boot code, which is executed by the microprocessor unit to load the control instructions stored in the rewritable non-volatile memory module 406 to the RAM of the memory management circuit 502 when the memory control circuit unit 404 is enabled. Then, the control instructions are executed by the microprocessor unit to perform operations, such as writing, reading or erasing data.

Further, in another exemplary embodiment, the control instructions of the memory management circuit 502 may also be implemented in a form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of the rewritable non-volatile memory module 406 or a group thereof. The memory writing circuit is configured to issue a write command sequence for the rewritable non-volatile memory module 406 in order to write data into the rewritable non-volatile memory module 406. The memory reading circuit is configured to issue a read command sequence for the rewritable non-volatile memory module 406 in order to read data from the rewritable non-volatile memory module 406. The memory erasing circuit is configured to issue an erase command sequence for the rewritable non-volatile memory module 406 in order to erase data from the rewritable non-volatile memory module 406. The data processing circuit is configured to process both the data to be written into the rewritable non-volatile memory module 406 and the data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 502 may further issue command sequence of other types to the rewritable non-volatile memory module 406 for instructing to perform the corresponding operations.

The host interface 504 is coupled to the memory management circuit 502 and configured to receive and identify commands and data sent from the host system 11. In other words, the commands and data transmitted by the host system 11 are transmitted to the memory management circuit 502 through the host interface 504. In the present exemplary embodiment, the host interface 504 is compatible with the SATA standard. However, it should be understood that the invention is not limited thereto, and the host interface 504 may also be compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written to the rewritable non-volatile memory module 406 is converted into a format acceptable by the rewritable non-volatile memory module 406 through the memory interface 506. Specifically, if the memory management circuit 502 intends to access the rewritable non-volatile memory module 406, the memory interface 506 sends corresponding command sequences. For example, the command sequences may include the write command sequence which instructs to write data, the read command sequence which instructs to read data, the erase command sequence which instructs to erase data, and other corresponding command sequences for instructing to perform various memory operations (e.g., changing read voltage levels or performing a garbage collection procedure). These command sequences are generated by the memory management circuit 502 and transmitted to the rewritable non-volatile memory module 406 through the memory interface 506, for example. The command sequences may include one or more signals, or data stored in the bus. The signals or the data may include command codes and programming codes. For example, information such as identification codes and memory addresses are included in the read command sequence.

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to perform an error checking and correcting operation to ensure the correctness of data. Specifically, when the memory management circuit 502 receives the write command from the host system 11, the error checking and correcting circuit 508 generates an ECC (error correcting code) and/or an EDC (error detecting code) for data corresponding to the write command, and the memory management circuit 502 writes data corresponding to the write command and the corresponding ECC and/or the EDC into the rewritable non-volatile memory module 406. Then, when the memory management circuit 502 reads the data from the rewritable non-volatile memory module 406, the corresponding ECC and/or the EDC are also read, and the error checking and correcting circuit 508 performs the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage device 10.

In the present exemplary embodiment, the memory cells of the rewritable non-volatile memory module 406 constitute a plurality of physical programming units, and the physical programming units constitute a plurality of physical erasing units. For example, the memory cells on the same word line constitute one or more physical programming units. If each of the memory cells can store more than one bit, the physical programming units on the same word line can be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. Generally, in the MLC NAND flash memory, a writing speed of the lower physical programming unit is higher than a writing speed of the upper physical programming unit, and/or a reliability of the lower physical programming unit is higher than a reliability of the upper physical programming unit.

In the present exemplary embodiment, the physical programming unit is a minimum unit for programming. That is, the physical programming unit is the minimum unit for writing data. For example, the physical programming unit is a physical page or a physical sector. When the physical programming unit is the physical page, the physical programming unit usually includes a data bit area and a redundancy bit area. The data bit area includes multiple physical sectors configured to store user data, and the redundant bit area is configured to store system data (e.g., an error correcting code).

In the present exemplary embodiment, the data bit area includes 32 physical sectors, and a size of each physical sector is 512 bytes (B). However, in other exemplary embodiments, the data bit area may also include 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 6:
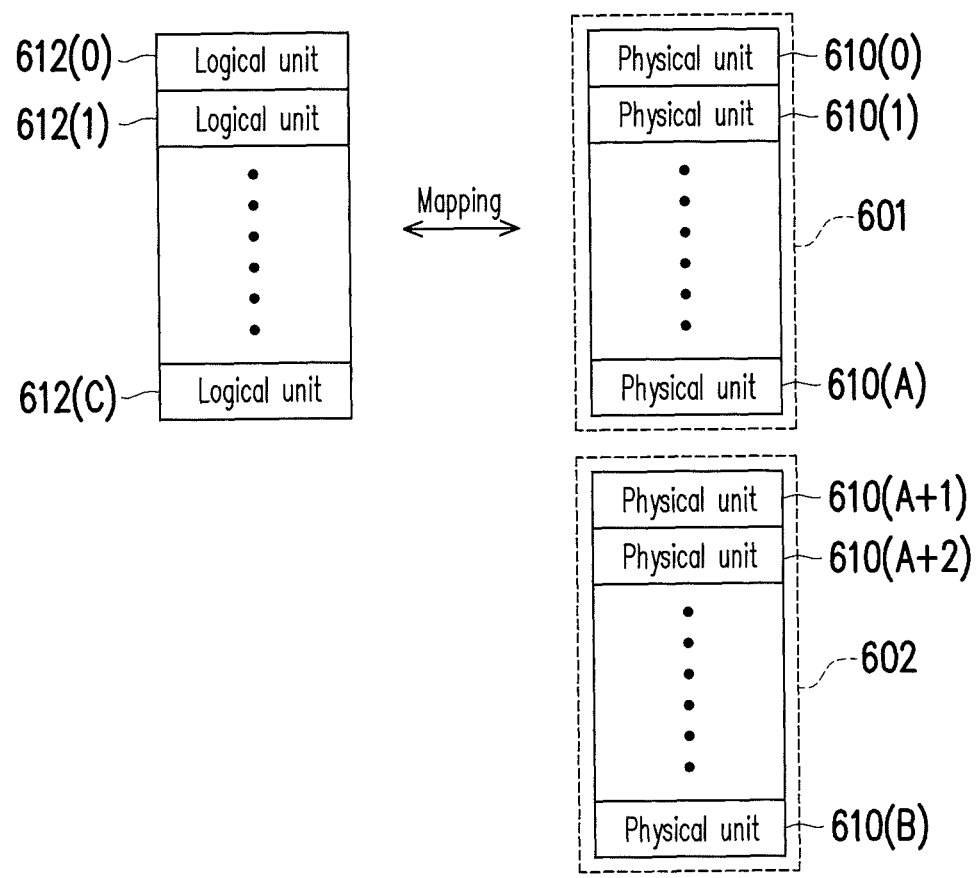
FIG. 6 is a schematic diagram illustrating management of a rewritable non-volatile memory module according to an exemplary embodiment of the invention.

FIG. 6 is a schematic diagram illustrating management of a rewritable non-volatile memory module according to an exemplary embodiment of the invention. It should be understood that terms, such as "select" and "group", are logical concepts which describe operations in the physical units of the rewritable non-volatile memory module 406. That is to say, the physical units of the rewritable non-volatile memory module 406 are logically operated while actual locations of the physical units of the rewritable non-volatile memory module 406 remain unchanged.

Referring to FIG. 6, the memory management circuit 502 logically groups the memory cells of the rewritable non-volatile memory module 406 into physical units 610(0) to 610(B). In this exemplary embodiment, each physical unit in the physical units 610(0) to 610(B) refers to one or more physical programming units. However, in another exemplary embodiment, each physical unit in the physical units 610(0) to 610(B) refers to one or more physical erasing units. For example, each physical unit in the physical units 610(0) to 610(B) is the physical erasing units 410(0) to 410(B).

In the present exemplary embodiment, the memory management circuit 502 logically groups the physical units 610(0) to 610(B) into a storage area 601 and a spare area 602. The physical units 610(0) to 610(A) in the storage area 601 are stored with data, and the physical units 610(A+1) to 610(B) in the spare area 602 are not yet used for storing data. For example, each physical unit belonging to the storage area 601 may be stored with valid data and/or invalid data, and one physical unit belonging to the storage area 601 being erased is associated to the spare area 602. After one physical unit belonging to the storage area 601 is fully written, one specific physical unit is then selected from the spare area 602 and associated to the storage area 601 for storing other data.

In the present exemplary embodiment, the memory management circuit 502 assigns logical units 612(0) to 612(C) for mapping to the physical units 610(0) to 610(A) in the storage area 601. In the present exemplary embodiment, the host system 11 accesses the data stored in the storage area 601 through a logical address (LA). Therefore, each of the logical units 612(0) to 612(C) refers to one logical address. However, in another exemplary embodiment, each one of the logical units 612(0) to 612(C) may also refer to one logical programming unit, one logical erasing unit or a composition of a plurality of consecutive or non-consecutive logical addresses.

In the present exemplary embodiment, the management of the rewritable non-volatile memory module 406 of the memory storage device 10 is performed based on the physical programming units (also known as page based). For example, when the write command is executed, the memory management unit 502 writes the data in a manner of one physical programming unit after another physical programming unit (also known as a random writing mechanism) regardless of which logical unit is the data currently written into. Accordingly, in the present exemplary embodiment, each logical unit in the logical units 612(0) to 612(C) is mapped to at least one of the physical programming units. More specifically, the memory management circuit 502 selects one empty physical erasing unit from the spare area 602 to serve as a current used physical erasing unit for writing data. Further, when the physical programming units of the current used physical erasing unit are fully written, the memory management circuit 502 selects another empty physical erasing unit from the spare area 602 to serve as the current used physical erasing unit in order to continuously write the data corresponding to the write command from the host system 11. However, the present invention is not limited thereto. For example, in another exemplary embodiment, the management of the rewritable non-volatile memory module 406 of the memory storage device 10 is performed based on the physical erasing units (also known as a block based).

Generally, the memory management circuit 502 records a mapping relation (also known as a logical-physical mapping relation) between the logical units and the physical units into at least one logical-physical mapping table. When the host system 11 intends to read the data from the memory storage device 10 or write the data into the memory storage device 10, the memory management circuit 502 may access the data in the memory storage device 10 according to the logical-to-physical mapping table. However, in the memory storage device having the rewritable non-volatile memory module 406 with its management performed based on the physical programming units, because each of the physical programming units stored with data is mapped to one logical unit (i.e., the logical-physical mapping table is recorded with a plurality of mapping relations between the logical units and the physical programming units of the physical erasing units), the logical-physical mapping table is extremely large. Particularly, when the memory storage device 10 is powered on again after an abnormal power-off, the memory management circuit 502 copies the data in the last programmed physical erasing unit before the power-off to another new physical erasing unit selected from the spare area 602, so as to ensure the correctness of data and continuously write data with use of the new physical erasing unit. Meanwhile, the memory management circuit 502 also updates the logical units corresponding to the physical programming units in the last programmed physical erasing unit before the power-off one by one as to be corresponding to the physical programming units of the new physical erasing unit in the logical-physical mapping table. In other words, when the memory management circuit 502 performs the operation of copying data in one specific physical erasing unit from the specific physical erasing unit to another physical erasing unit, the memory management circuit 502 needs to change thousands of entry values in the logical-physical mapping table. Accordingly, a time spent for copying the data is increased such that a longer response time must be waited when other write or read commands are executed by the host.

In the light of this, in the present exemplary embodiment, the memory management circuit 502 assigns a virtual block of a first layer and a virtual block of a second layer each including the logical units 612(0) to 612(C). Further, each of the virtual block of the first layer and the virtual block of the second layer further includes a plurality of virtual blocks corresponding to each physical erasing unit (e.g., the physical erasing units 410(0) to 410(A)) in the storage area 601. Specifically, when the memory management circuit 502 writes the data received from the host system 11 into at least one physical programming unit of one selected empty physical erasing unit (also known as a first physical erasing unit), the memory management circuit 502 first assigns a virtual block belonging to the first layer (also known as a first virtual block) and a virtual block belonging to the second layer (also known as a second virtual block) which are corresponding to the first physical erasing unit, and then further assigns logical units (also known as first logical units) corresponding to at least one of the physical programming units of the first physical erasing unit to the first virtual block and the second virtual block. That is, the first virtual block and the second virtual block each includes multiple first logical units among the logical units 612(0) to 612(C).

Figure 7:
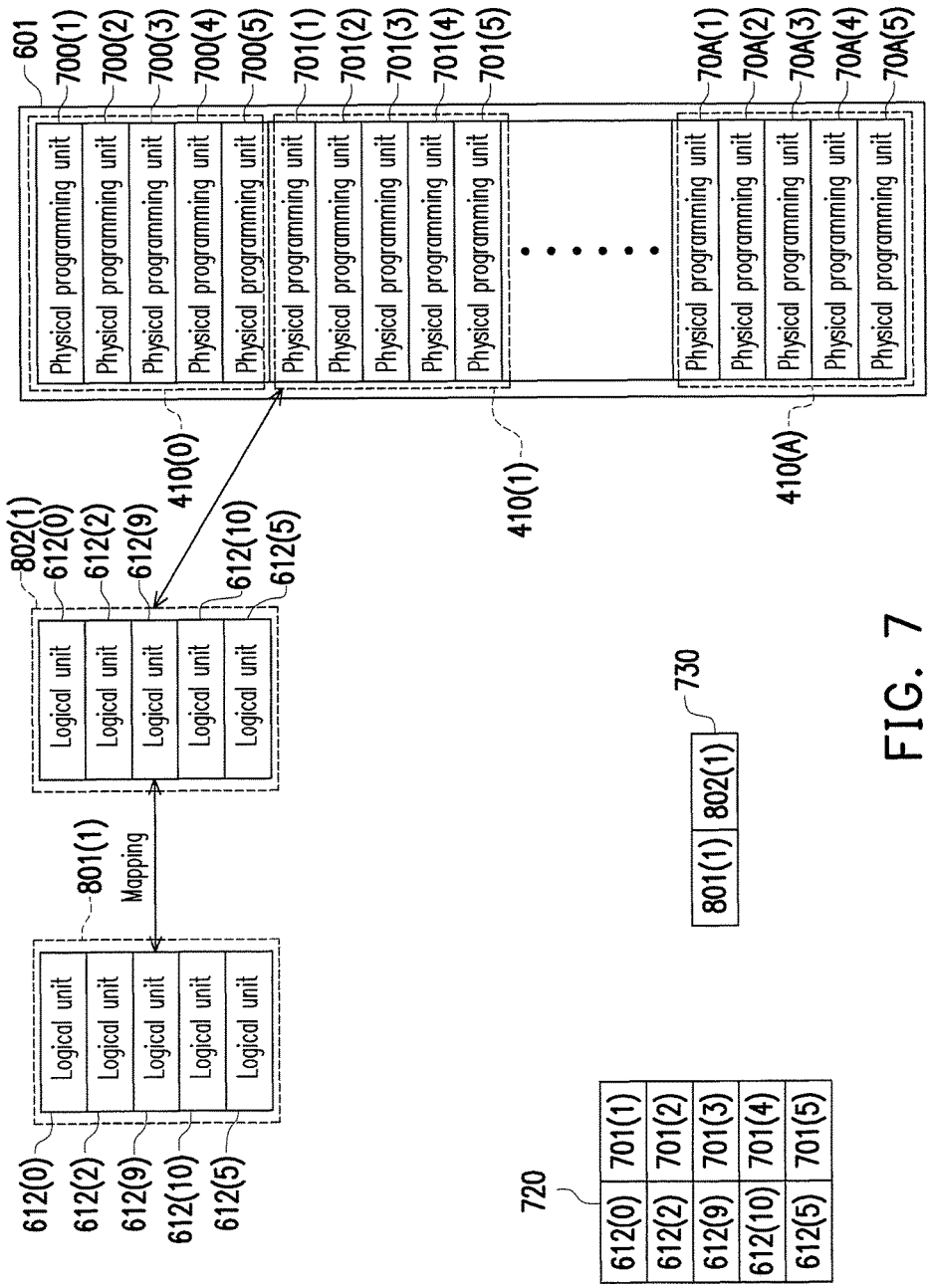
FIG. 7 is a schematic diagram illustrating a mapping relation between the virtual block and the physical erasing unit according to an exemplary embodiment of the invention.

FIG. 7 is a schematic diagram illustrating a mapping relation between the virtual block and the physical erasing unit according to an exemplary embodiment of the invention.

For descriptive convenience, FIG. 7 is illustrated using an example in which one physical erasing unit includes five physical programming units. However, person with ordinary skill in the art should be able to understand that one physical erasing unit can include not only five physical programming units but any other numbers of physical programming units, and details regarding the same are omitted hereinafter. Referring to FIG. 7, after a write command which instructs to sequentially write write-in data into first logical units 612(0), 612(2), 612(9), 612(9) and 612(5) among the logical units 612(0) to 612(C) is received by the memory management circuit 502, the memory management circuit 502 associates the first physical erasing unit 410(1) selected from the spare area 602 to the storage area 601 and uses its physical programming units 701(1) to 710(5) to store the write-in data. For example, the memory management circuit 502 writes the data into the physical programming units 701(1) to 710(5) in the manner of one physical programming unit after another physical programming unit.

Next, in the present exemplary embodiment, the memory management circuit 502 assigns the first logical units 612(0), 612(2), 612(9), 612(10) and 612(5) to a first virtual block 801(1) and a second virtual block 802(1) which are mapped to the first physical erasing unit 410(1). That is, the first virtual block 801(1) and the second virtual block 802(1) each includes the first logical units 612(0), 612(2), 612(9), 612(10) and 612(5). Then, the memory management circuit 502 maps the first virtual block 801(1) to the second virtual block 802(1), and maps the first logical units 612(0), 612(2), 612(9), 612(10) and 612(5) assigned to the first virtual block 801(1) and the second virtual block 802(1) to the physical programming units 701(1) to 701(5) of the first physical erasing unit 410(1).

Further, in the present exemplary embodiment, the memory management circuit 502 records a mapping relation between the first virtual block 801(1) and the first physical erasing unit 410(1) as first mapping information 720, and records a mapping relation between the first virtual block 801(1) and the second virtual block 802(1) as second mapping information 730. For example, the first mapping information 720 is the first logical units 612(0), 612(2), 612(9), 612(10) and 612(5) mapped to the first physical programming unit 710(1), the second physical programming unit 710(2), the third physical programming unit 710(3), the fourth physical programming unit 710(4) and the fifth physical programming unit 710(5) in the first physical erasing unit 410(1), respectively. Therefore, the memory management circuit 502 records a correspondence relation between the first logical units 612(0), 612(2), 612(9), 612(10) and 612(5) and a written sequence of the physical programming units 701(1) to 701(5) in the first physical erasing unit 410(1) as the first mapping information 720 according to a write sequence instructed by the write command. On the other hand, the second mapping information 730 is the first virtual block 801(1) mapped the second virtual block 802(1). Therefore, the memory management circuit 502 also records a correspondence relation between the first virtual block 801(1) and the second virtual block 802(1) as the second mapping information 730.

As described above, the memory management circuit 502 also assigns the virtual block of the first layer and the virtual block of the second layer for each physical erasing unit stored with data in the storage area 601 (i.e., the physical erasing unit 410(0) and the physical erasing units 410(2) to 410(A)) in order to record the first mapping information and the second mapping information of each physical erasing unit in the storage area 601. In other words, each of the physical erasing units 410(0) to 410(A) in the storage area 601 has the virtual block of the first layer and the virtual block of the second layer corresponding thereto. The mapping relation between the logical units included by the virtual block of the first layer of each physical erasing unit and the respective physical erasing unit, and the mapping relation between the virtual block of the first layer and the virtual block of the second layer are recorded as the first mapping information and the second mapping information corresponding to the respective one of the physical erasing units, respectively.

Figure 8A:
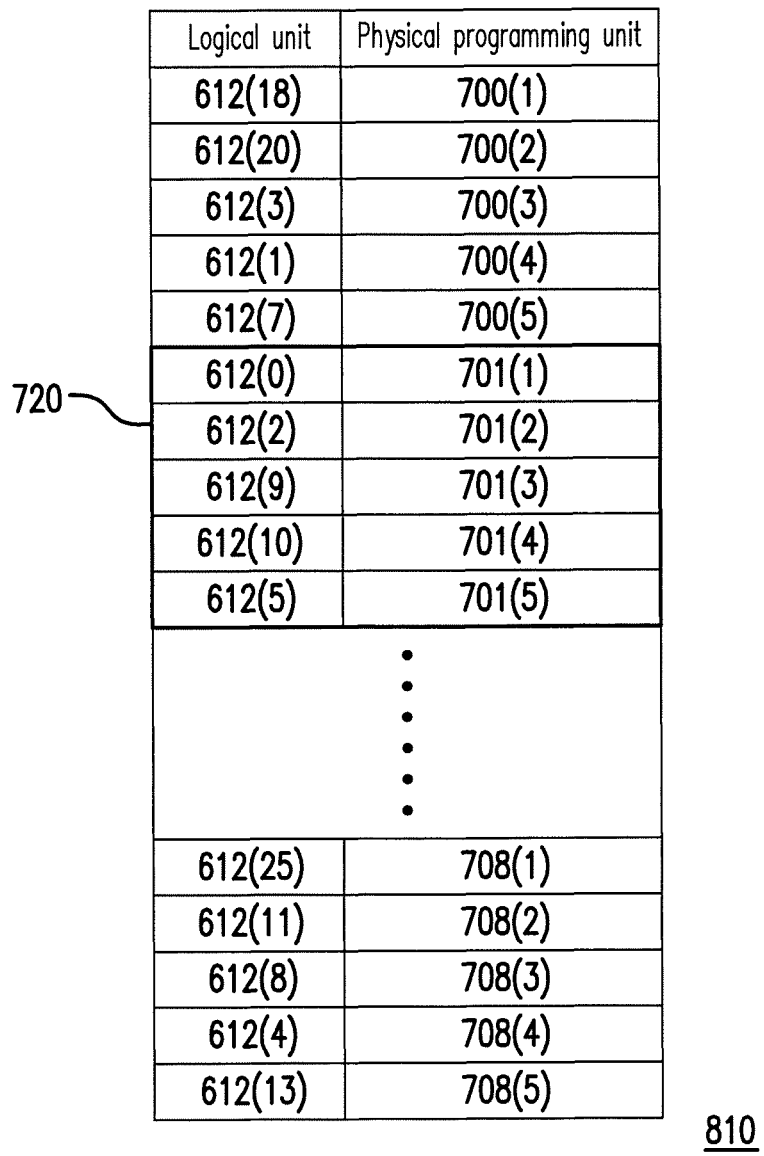
FIG. 8A is a schematic diagram illustrating a logical-physical mapping table according to an exemplary embodiment of the invention.

FIG. 8A is a schematic diagram illustrating a logical-physical mapping table according to an exemplary embodiment of the invention. FIG. 8B is a schematic diagram illustrating a logical-physical re-mapping table according to an exemplary embodiment of the invention.

Referring to FIG. 8A, a logical-physical mapping table 810 in the present exemplary embodiment is configured to record mapping relations between the logical units 612(0) to 612(C) and the physical programming units stored with data. For example, the first mapping information 720 (i.e., the mapping relations between the first logical units 612(0), 612(2), 612(9), 612(10) and 612(5) and the physical programming units 701(1) to 710(5) of the first physical erasing unit 410(1)) is recorded into the logical-physical mapping table 810 in a manner of sequentially mapping the first logical units 612(0), 612(2), 612(9), 612(10) and 612(5) to the first to the fifth physical programming units of the first physical erasing unit 410(1). Similarly, the correspondence relations of the other physical erasing units stored with data in the storage area 601 (i.e., the physical erasing unit 410(0) and the physical erasing units 410(2) to 410(A)) and their logical units are also recorded into the logical-physical mapping table 810.

Referring to FIG. 8B, in the present exemplary embodiment, the memory management circuit 502 also establishes a logical-physical re-mapping table 820, and records the second mapping information 730 (i.e., the mapping relation between the first virtual block 801(1) belonging to the first layer and the second virtual block 802(1) belonging to the second layer) into the logical-physical re-mapping table 820. For example, the memory management circuit 502 records all the second mapping information recorded for the physical erasing units 410(0) to 410(A) stored with data in the storage area 601 into the logical-physical re-mapping table 820.

Herein, it is assumed that the memory storage device 10 is powered on again after an abnormal power-off while the memory management circuit 502 is storing data into the physical programming units 701(1) to 701(5) of the first physical erasing unit 410(1) corresponding to the first logical units 612(0), 612(2), 612(9), 612(10) and 612(5). Then, the memory management circuit 502 copies the data of the last programmed physical erasing unit (i.e., the first physical erasing unit 410(1)) to another physical erasing unit.

Figure 9:
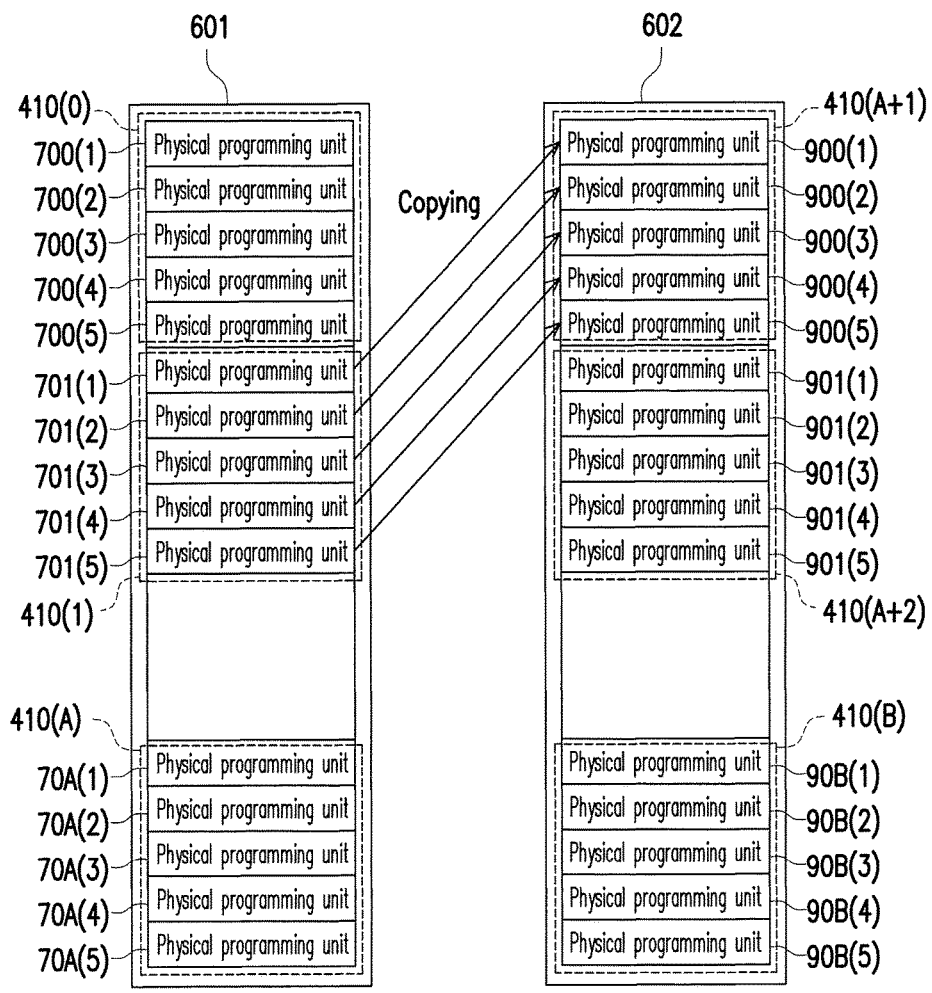
FIG. 9 is a schematic diagram illustrating an operation of copying data from one physical erasing unit to another physical erasing unit according to an exemplary embodiment of the invention.
Figure 10A:
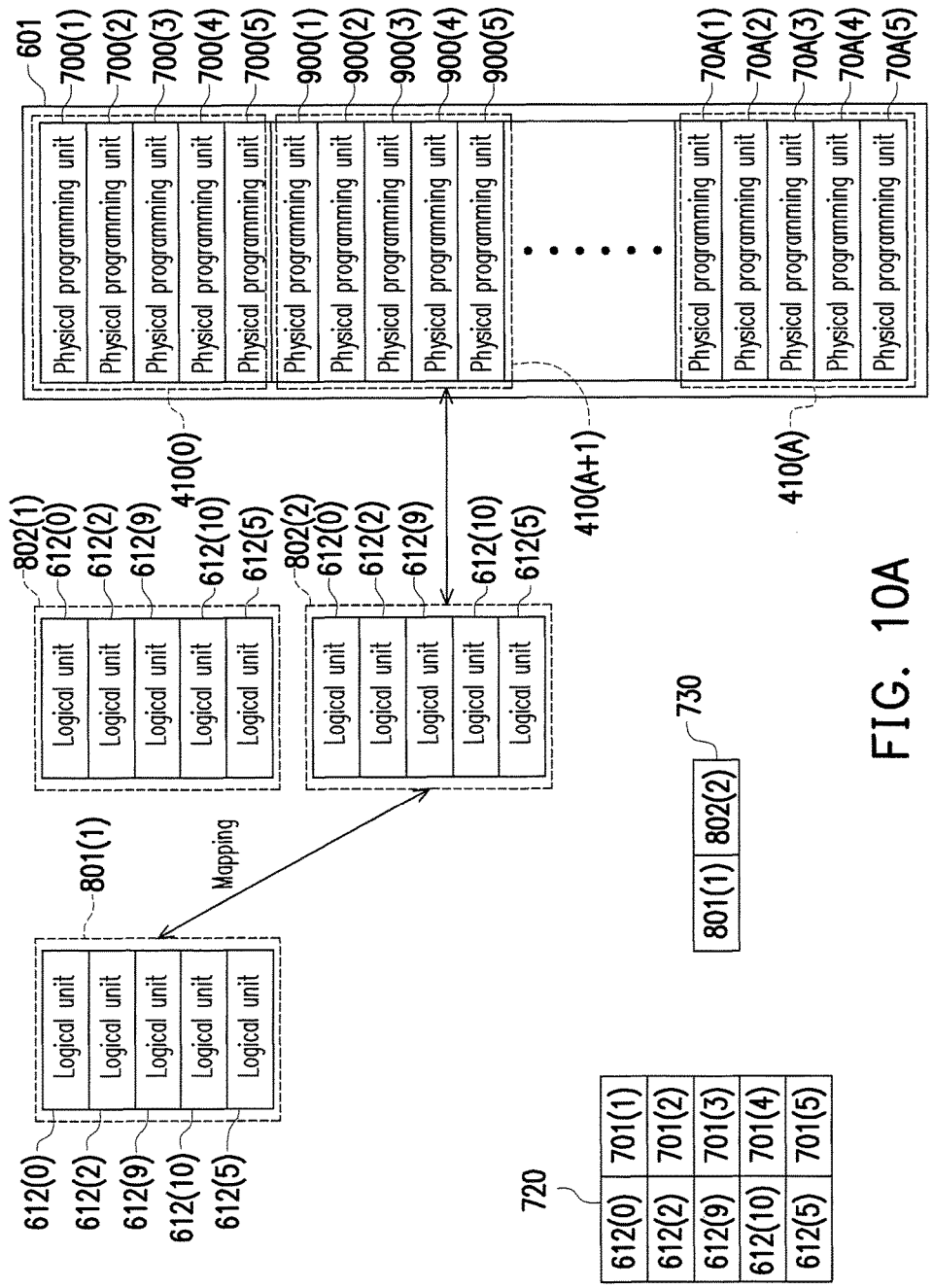
FIG. 10A is a schematic diagram illustrating an operation of updating the mapping table after copying data from one physical erasing unit to another physical erasing unit according to an exemplary embodiment of the invention.

FIG. 9 is a schematic diagram illustrating an operation of copying data from one physical erasing unit to another physical erasing unit according to an exemplary embodiment of the invention. FIG. 10A is a schematic diagram illustrating an operation of updating the mapping table after copying data from one physical erasing unit to another physical erasing unit according to an exemplary embodiment of the invention. FIG. 10B is a schematic diagram illustrating the logical-physical mapping table and the logical-physical re-mapping table after copying data from one physical erasing unit to another physical erasing unit according to an exemplary embodiment of the invention.

Referring to FIG. 9, when the memory management circuit 502 copies the data belonging to the first physical erasing unit 410(1) from the first physical erasing unit 410(1) to another physical erasing unit, the memory management circuit 502 selects one empty physical erasing unit 410(A+1) (also known as a second physical erasing unit 410(A+1)) from the spare area 602 to store the data in the first physical erasing unit 410(1). Specifically, the memory management circuit 502 sequentially writes the data in the physical programming units 701(1) to 701(5) of the first physical erasing unit 410(1) into corresponding physical programming units (i.e., physical programming units 900(1) to 900(5)) of the second physical erasing unit 410(A+1).

Then, referring to FIG. 10A and FIG. 10B, the memory management circuit 502 associates the second physical erasing unit 410(A+1) to the storage area 601. Particularly, the second physical erasing unit 410(A+1) also includes a corresponding virtual block 802(2) of the second layer (also known as a third virtual block 802(2)). That is, the third virtual block 802(2) is mapped to the second physical erasing unit 410(A+1). Therefore, the memory management circuit 502 changes the first virtual block 801(1) of the first layer originally mapped to the second virtual block 802(1) of the second layer as to be mapped to the third virtual block 802(2) of the second layer. Particularly, a written sequence of the physical programming units 900(1) to 900(5) in the second physical erasing unit 410(A+1) does not change. Therefore, the memory management circuit 502 does not need to change the content of the first mapping information 720 in the logical-physical mapping table 810. It can be known that, after the data belonging to the first physical erasing unit 410(1) is copied from the first physical erasing unit 410(1) to the second physical erasing unit 410(A+1) by the memory management circuit 502, only the mapping relation between the first virtual block 801(1) of the first layer and the second virtual block 802(1) of the second layer changes. Accordingly, the memory management circuit 502 only needs to update the second mapping information 730 as a mapping relation between the first virtual block 801(1) and the third virtual block 802(2). In other words, the memory management circuit 502 only needs to change "802(1)" in the second mapping information 730 into "802(2)". As shown in FIG. 10B, the memory management circuit 502 changes the second mapping information 730 in the logical-physical re-mapping table 820, for example. Accordingly, in the present exemplary embodiment of the invention, in the event where the memory management circuit 502 needs to copy the data to another physical erasing unit using the physical erasing unit as a unit, after the operation of moving data, the memory management circuit 502 only needs to change one entry value in the logical-physical re-mapping table 820 instead of updating the logical units corresponding to the physical programming units in the physical erasing unit stored with original data in the logical-physical mapping table 810 one by one as corresponding to the physical programming units of the new physical erasing unit.

In the present exemplary embodiment of the invention, in the condition of FIG. 10A and FIG. 10B, if the memory management circuit 502 sends a read command sequence which instructs to read the data from at least one logical unit among the first logical units 612(0), 612(2), 612(9), 612(10) and 612(5), the memory management circuit 502 can read the data corresponding to the read command sequence according to the first mapping information 720 recorded in the logical-physical mapping table 810 and the second mapping information 730 recorded in the logical-physical re-mapping table 820. For example, if the read command sequence instructs to read the data from the first logical unit 612(10), the memory management circuit 502 searches the virtual block of the first layer for the first virtual block 801(1) that includes the first logical unit 612(10), learns that the first virtual block 801(1) is currently mapped to the third virtual block 802(2) corresponding to the second physical erasing unit 410(A+1) according to the second mapping information 730 of the logical-physical re-mapping table 820, and learns that the first logical unit 612(10) is mapped to the fourth physical programming unit in one physical erasing unit according to the first mapping information 720 of the logical-physical mapping table 810. Accordingly, the memory management circuit 502 reads the data from the fourth physical programming unit of the second physical erasing unit 410(A+1) (i.e., the physical programming unit 900(4)).

Figure 11:
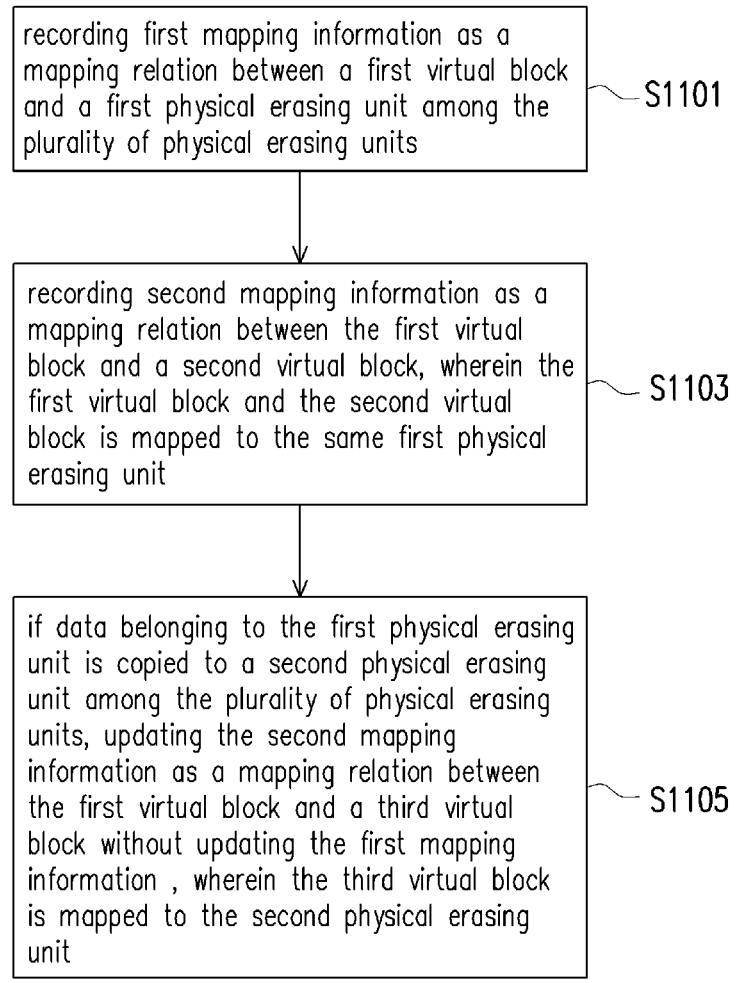
FIG. 11 is a flowchart illustrating a mapping table updating method according to an exemplary embodiment of the invention.

FIG. 11 is a flowchart illustrating a mapping table updating method according to an exemplary embodiment of the invention.

Referring to FIG. 11, in step S1101, the memory management circuit 502 records first mapping information as a mapping relation between a first virtual block and a first physical erasing unit.

In step S1103, the memory management circuit 520 records second mapping information as a mapping relation between the first virtual block and a second virtual block, wherein the second virtual block is mapped to the first physical erasing unit.

In step S1105, the memory management circuit 502 updates the second mapping information as a mapping relation between the first virtual block and a third virtual block if copying data belonging to the first physical erasing unit to a second physical erasing unit, wherein the third virtual block is mapped to the second physical erasing unit.

It should be noted that, aforesaid operation of copying the data from one physical erasing unit to another physical erasing unit by the memory management circuit 502 using the physical erasing unit as a unit is not limited only to be performed in the case of powering on after the abnormal power-off occurred on the memory storage device 10. For example, in another exemplary embodiment, the mapping table updating method of the invention may also be applied in a read-disturb protection mechanism. Specifically, when data stored by the same physical erasing unit is read multiple times, it is likely that the read data may include errors, or worst yet, the data stored in the physical erasing unit read multiple times may show abnormal states or may even lost. Therefore, the memory management circuit 502 may re-write data in one specific physical erasing unit into other physical erasing units through read-disturb protection mechanism during the read operation, so as to ensure the correctness of the data. Moreover, in yet another exemplary embodiment, the mapping table method may also be applied in a wear leveling operation. For example, the wear leveling operation refers to an exchange of the physical erasing units in the storage area with the physical erasing units in the spare area each time when the rewritable non-volatile memory is operated over a fixed period of time or at a specific time-point, so that the physical erasing units having less erasing count in the storage area may be exchanged to the spare area for programming (or writing) usage. In view of the above, the invention is not intended to limit the application scenarios of the mapping table updating method. Any operation of moving or copying data using the physical erasing unit as a unit can adopt use of the mapping table updating method to prevent the problem caused by changing thousands of data entries in the logical-physical mapping table (i.e., the time spent for copying the data is increased such that a longer response time must be waited when other write or read commands are executed by the host).

In addition, steps depicted in FIG. 11 are described in detail as above so that related description thereof is omitted hereinafter. It should be noted that, the steps depicted in FIG. 11 may be implemented as a plurality of program codes or circuits, which are not particularly limited in the invention. Further, the method disclosed in FIG. 11 may be implemented by reference with above exemplary embodiments, or may be implemented separately, which are not particularly limited in the invention.

In summary, according to the mapping table updating method, the memory storage device and the memory control circuit unit proposed in the exemplary embodiments of the invention, when the memory storage device copies the data from one original physical erasing unit to another new physical erasing unit using the physical erasing unit as a unit, only one entry value in the logical-physical re-mapping table needs to be changed to record the new physical erasing unit. By doing so, the problem caused by changing thousands of entry values in the logical-physical mapping table (i.e., the time spent for copying the data is increased such that a longer response time must be waited when other write or read commands are executed by the host) may be prevented. As a result, speed and performance of the memory storage device may be improved in terms of overall operation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A mapping table updating method for a memory storage device, the memory storage device having a rewritable non-volatile memory module, the rewritable non-volatile memory module having a plurality of physical erasing units, each of the physical erasing units having a plurality of physical programming units, the mapping table updating method comprising:
   recording first mapping information as a mapping relation between a first virtual block and a first physical erasing unit among the plurality of physical erasing units;
   recording second mapping information as a mapping relation between the first virtual block and a second virtual block, wherein the first virtual block and the second virtual block are mapped to the same first physical erasing unit; and
   if data belonging to the first physical erasing unit is copied to a second physical erasing unit among the plurality of physical erasing units, updating the second mapping information as a mapping relation between the first virtual block and a third virtual block without updating the first mapping information, wherein the third virtual block is mapped to the second physical erasing unit.

2. The mapping table updating method of claim 1, further comprising:
   establishing a logical-physical re-mapping table, wherein the second mapping information is recorded into the logical-physical re-mapping table.

3. The mapping table updating method of claim 1, wherein a step before copying the data belonging to the first physical erasing unit to the second physical erasing unit comprises:
   assigning a plurality of logical units, wherein each of the logical units corresponds to at least one of the physical programming units; and
   assigning a plurality of first logical units corresponding to the data of the first physical erasing unit to the first virtual block.

4. The mapping table updating method of claim 3, wherein a logical-physical mapping table is stored in the rewritable non-volatile memory module, and the step of recording the first mapping information as the mapping relation between the first virtual block and the first physical erasing unit comprises:
   recording the first mapping information as a mapping relation between the first logical units and a written sequence of the physical programming units in the first physical erasing unit; and
   recording the first mapping information into the logical-physical mapping table.

5. The mapping table updating method of claim 4, wherein a step after copying the data belonging to the first physical erasing unit to the second physical erasing unit comprises:
   sending a read command sequence, wherein the read command sequence instructs to read data from at least one logical unit among the first logical units; and
   receiving the data read from at least one of the physical programming units of the second physical erasing unit according to the first mapping information and the second mapping information.

6. The mapping table updating method of claim 1, wherein the step of copying the data belonging to the first physical erasing unit to the second physical erasing unit comprises:

sequentially writing the data in the physical programming units of the first physical erasing unit into the corresponding physical programming units of the second physical erasing unit.

7. The mapping table updating method of claim 6, wherein a written sequence of the physical programming units in the second physical erasing unit is identical to a written sequence of the physical programming units in the first physical erasing unit.

8. A memory control circuit unit for controlling a rewritable non-volatile memory module, wherein the rewritable non-volatile memory module comprises a plurality of physical erasing units, and each of the physical erasing units comprises a plurality of physical programming units, wherein the memory control circuit unit comprises:
   a host interface, configured to couple to a host system;
   a memory interface, configured to couple to the rewritable non-volatile memory module; and
   a memory management circuit, coupled to the host interface and the memory interface, and configured to record first mapping information as a mapping relation between a first virtual block and a first physical erasing unit among the plurality of physical erasing units,
   wherein the memory management circuit is further configured to record second mapping information as a mapping relation between the first virtual block and a second virtual block, wherein the first virtual block and the second virtual block are mapped to the same first physical erasing unit,
   wherein if data belonging to the first physical erasing unit is copied to a second physical erasing unit among the plurality of physical erasing units, the memory management circuit is further configured to update the second mapping information as a mapping relation between the first virtual block and a third virtual block without updating the first mapping information, wherein the third virtual block is mapped to the second physical erasing unit.

9. The memory control circuit unit of claim 8, wherein the memory management circuit is further configured to establish a logical-physical re-mapping table, wherein the second mapping information is recorded into the logical-physical re-mapping table.

10. The memory control circuit unit of claim 8, wherein before copying the data belonging to the first physical erasing unit to the second physical erasing unit,
   the memory management circuit is further configured to assign a plurality of logical units, wherein each of the logical units corresponds to at least one of the physical programming units; and
   the memory management circuit is further configured to assign a plurality of first logical units corresponding to the data of the first physical erasing unit to the first virtual block.

11. The memory control circuit unit of claim 10, wherein a logical-physical mapping table is stored in the rewritable non-volatile memory module, and in the operation of recording the first mapping information as the mapping relation between the first virtual block and the first physical erasing unit,
   the memory management circuit is further configured to record the first mapping information as a mapping relation between the first logical units and a written sequence of the physical programming units in the first physical erasing unit, and record the first mapping information into the logical-physical mapping table.

12. The memory control circuit unit of claim 11, wherein after copying the data belonging to the first physical erasing unit to the second physical erasing unit,
   the memory management circuit is further configured to send a read command sequence, wherein the read command sequence instructs to read data from at least one logical unit among the first logical units; and
   the memory management circuit is further configured to receive the data read from at least one of the physical programming units of the second physical erasing unit according to the first mapping information and the second mapping information.

13. The memory control circuit unit of claim 8, wherein in the operation of copying the data belonging to the first physical erasing unit to the second physical erasing unit, the memory management circuit is further configured to sequentially write the data in the physical programming units of the first physical erasing unit into the corresponding physical programming units of the second physical erasing unit.

14. The memory control circuit unit of claim 13, wherein a written sequence of the physical programming units in the second physical erasing unit is identical to a written sequence of the physical programming units in the first physical erasing unit.

15. A memory storage device, comprising:
   a connection interface unit, configured to couple to a host system;
   a rewritable non-volatile memory module comprising a plurality of memory cells; and
   a memory control circuit unit, coupled to the connection interface unit and the rewritable non-volatile memory module, and configured to record first mapping information as a mapping relation between a first virtual block and a first physical erasing unit among the plurality of physical erasing units,
   wherein the memory control circuit unit is further configured to record second mapping information as a mapping relation between the first virtual block and a second virtual block, wherein the first virtual block and the second virtual block are mapped to the same first physical erasing unit,
   wherein if data belonging to the first physical erasing unit is copied to a second physical erasing unit among the plurality of physical erasing units, the memory control circuit unit is further configured to update the second mapping information as a mapping relation between the first virtual block and a third virtual block without updating the first mapping information, wherein the third virtual block is mapped to the second physical erasing unit.

16. The memory storage device of claim 15, wherein the memory control circuit unit is further configured to establish a logical-physical re-mapping table, wherein the second mapping information is recorded into the logical-physical re-mapping table.

17. The memory storage device of claim 15, wherein before copying the data belonging to the first physical erasing unit to the second physical erasing unit,
   the memory control circuit unit is further configured to assign a plurality of logical units, wherein each of the logical units corresponds to at least one of the physical programming units; and
   the memory control circuit unit is further configured to assign a plurality of first logical units corresponding to the data of the first physical erasing unit to the first virtual block.

18. The memory storage device of claim 17, wherein a logical-physical mapping table is stored in the rewritable non-volatile memory module, and in the operation of recording the first mapping information as the mapping relation between the first virtual block and the first physical erasing unit, the memory control circuit unit is further configured to record the first mapping information as a mapping relation between the first logical units and a written sequence of the physical programming units in the first physical erasing unit, and record the first mapping information into the logical-physical mapping table.

19. The memory storage device of claim 18, wherein after copying the data belonging to the first physical erasing unit to the second physical erasing unit, the memory control circuit unit is further configured to send a read command sequence, wherein the read command sequence instructs to read data from at least one logical unit among the first logical units; and the memory control circuit unit is further configured to receive the data read from at least one of the physical programming units of the second physical erasing unit according to the first mapping information and the second mapping information.

20. The memory storage device of claim 15, wherein in the operation of copying the data belonging to the first physical erasing unit to the second physical erasing unit, the memory control circuit unit is further configured to sequentially write the data in the physical programming units of the first physical erasing unit into the corresponding physical programming units of the second physical erasing unit.

21. The memory storage device of claim 20, wherein a written sequence of the physical programming units in the second physical erasing unit is identical to a written sequence of the physical programming units in the first physical erasing unit.

* * * * *